US012647973B2

(12) United States Patent
Sun et al.

(10) Patent No.: US 12,647,973 B2
(45) Date of Patent: Jun. 2, 2026

(54) MULTIPLE LAYER PHYSICAL UPLINK SHARED CHANNEL (PUSCH) TRANSMISSION THAT USES MORE THAN ONE CODEWORD

(71) Applicant: Apple Inc., Cupertino, CA (US)

(72) Inventors: Haitong Sun, Cupertino, CA (US); Jie Cui, San Jose, CA (US); Oghenekome Oteri, San Diego, CA (US); Huaning Niu, San Jose, CA (US); Dawei Zhang, Saratoga, CA (US); Chunxuan Ye, San Diego, CA (US); Wei Zeng, Saratoga, CA (US); Sigen Ye, Whitehouse Station, NJ (US)

(73) Assignee: Apple Inc., Cupertino, CA (US)

( * ) Notice: Subject to any disclaimer, the term of this patent is extended or adjusted under 35 U.S.C. 154(b) by 242 days.

(21) Appl. No.: 18/382,889

(22) Filed: Oct. 23, 2023

(65) Prior Publication Data

US 2024/0147465 A1　　May 2, 2024

Related U.S. Application Data

(63) Continuation of application No. 18/382,229, filed on Oct. 20, 2023.

(Continued)

(51) Int. Cl.
*H04W 72/1268*　　(2023.01)
*H04W 72/21*　　(2023.01)
*H04W 72/232*　　(2023.01)

(52) U.S. Cl.
CPC ....... *H04W 72/1268* (2013.01); *H04W 72/21* (2023.01); *H04W 72/232* (2023.01)

(58) Field of Classification Search
CPC ... H04W 52/34; H04W 72/23; H04W 52/146; H04W 52/367; H04W 72/04;
(Continued)

(56) References Cited

U.S. PATENT DOCUMENTS

2014/0192729 A1* 7/2014 Kim ...................... H04L 5/0051
　　　　　　　　　　　　　　　　　　　　　　370/329
2014/0293881 A1 10/2014 Khoshnevis et al.
(Continued)

FOREIGN PATENT DOCUMENTS

WO　　WO 2021/184296　　9/2021

OTHER PUBLICATIONS

International Search Report and Written Opinion dated Feb. 12, 2024, PCT/US2023/036057, 14 pages.
(Continued)

*Primary Examiner* — Joseph Arevalo
(74) *Attorney, Agent, or Firm* — Brownstein Hyatt Farber Schreck, LLP

(57) ABSTRACT

A user equipment (UE) includes a transceiver and a processor. The processor is configured to receive, from a network and via the transceiver, a configuration for a multiple layer physical uplink shared channel (PUSCH) transmission using more than one codeword. The processor is also configured to transmit, via the transceiver and in accordance with the configuration for the multiple layer PUSCH transmission that uses more than one codeword, the multiple layer PUSCH transmission. The multiple layer PUSCH transmission is transmitted on at least a first layer of the multiple layers using a first codeword of the more than one codeword, and on at least a second layer of the multiple layers using a second codeword of the more than one codeword.

20 Claims, 6 Drawing Sheets

300

| 306 | 302 | 304 | |
| NUMBER OF LAYERS | NUMBER OF CODEWORDS | LAYER-TO-CODEWORD MAPPING PRINCIPLE | LAYER-TO-CODEWORD MAPPING DETAIL |
| --- | --- | --- | --- |
| 1 | 1 | 1 LAYER MAPS TO FIRST CW | LAYER 0 <-> CW 0 |
| 2 | 1 | 2 LAYERS MAP TO FIRST CW | LAYER 0/1 <-> CW 0 |
| 3 | 1 | 3 LAYERS MAP TO FIRST CW | LAYER 0/1/2 <-> CW 0 |
| 4 | 1 | 4 LAYERS MAP TO FIRST CW | LAYER 0/1/2/3 <-> CW 0 |
| 5 | 2 | 2 LAYERS MAP TO FIRST CW<br>3 LAYERS MAP TO SECOND CW | LAYER 0/1 <-> CW 0<br>LAYER 2/3/4 <-> CW 1 |
| 6 | 2 | 3 LAYERS MAP TO FIRST CW<br>3 LAYERS MAP TO SECOND CW | LAYER 0/1/2 <-> CW 0<br>LAYER 3/4/5 <-> CW 1 |
| 7 | 2 | 3 LAYERS MAP TO FIRST CW<br>4 LAYERS MAP TO SECOND CW | LAYER 0/1/2 <-> CW 0<br>LAYER 3/4/5/6 <-> CW 1 |
| 8 | 2 | 4 LAYERS MAP TO FIRST CW<br>4 LAYERS MAP TO SECOND CW | LAYER 0/1/2/3 <-> CW 0<br>LAYER 4/5/6/7 <-> CW 1 |

Related U.S. Application Data

(60) Provisional application No. 63/420,023, filed on Oct. 27, 2022.

(58) Field of Classification Search
CPC ..... H04W 52/30; H04W 16/32; H04W 24/10; H04W 52/265; H04W 52/322; H04W 52/325; H04W 52/346; H04W 52/38; H04W 52/40; H04W 72/0473; H04W 72/20; H04W 72/21; H04W 88/02; H04W 24/08; H04W 40/22; H04W 48/12; H04W 52/50; H04W 56/0045; H04W 74/0833; H04W 84/045; H04W 88/04
USPC ................. 370/329, 330, 318, 252, 280, 311
See application file for complete search history.

(56) References Cited

U.S. PATENT DOCUMENTS

| | | | | |
|---|---|---|---|---|
| 2017/0215155 A1* | 7/2017 | Nogami | .............. | H04W 52/146 |
| 2017/0230913 A1* | 8/2017 | Ouchi | ................... | H04W 52/30 |
| 2017/0230917 A1* | 8/2017 | Ouchi | ................... | H04L 5/0055 |
| 2019/0149205 A1 | 5/2019 | Kim et al. | | |
| 2021/0067304 A1* | 3/2021 | Yokomakura | ........... | H04L 5/001 |
| 2021/0258200 A1* | 8/2021 | Lee | ........................ | H04L 5/0051 |
| 2022/0303812 A1* | 9/2022 | Chung | ................ | H04W 52/281 |
| 2022/0376844 A1 | 11/2022 | Muruganathan | | |
| 2023/0035992 A1 | 2/2023 | Zhang et al. | | |
| 2023/0058765 A1* | 2/2023 | Zhu | ........................ | H04L 5/0051 |
| 2023/0145316 A1 | 5/2023 | Oteri et al. | | |
| 2023/0261833 A1* | 8/2023 | Zhu | ........................ | H04L 5/0044 |
| | | | | 370/329 |
| 2024/0056939 A1* | 2/2024 | Basu Mallick | ....... | H04W 88/04 |
| 2024/0072981 A1* | 2/2024 | Zhu | ........................ | H04L 5/0094 |
| 2024/0155606 A1* | 5/2024 | Wang | ................... | H04B 7/0456 |
| 2024/0244595 A1* | 7/2024 | Wang | ................... | H04L 5/0094 |
| 2024/0365312 A1* | 10/2024 | Lin | ........................ | H04L 1/188 |

OTHER PUBLICATIONS

Huawei, "Multiplexing of control and data in multi-layer PUSCH transmission," 3GPP TSG RAN WG1 meeting #59bis, Valencia, Spain, Jan. 18, 2010 to Jan. 22, 2010, 6 pages.

Intel Corporation, "Discussion on enhancement for 8Tx UL transmission," 3GPP TSG RAN WG1 #110bis-e, e-meeting Oct. 10, 2022 to Oct. 19, 2022, 13 pages.

Qualcomm Incorporated, "UL grants for MIMO transmissions," 3GPP TSG-RAN WG1, #61bis, Dresden, Germany, Jun. 28, 2010 to Jun. 2, 2010, 6 pages.

* cited by examiner

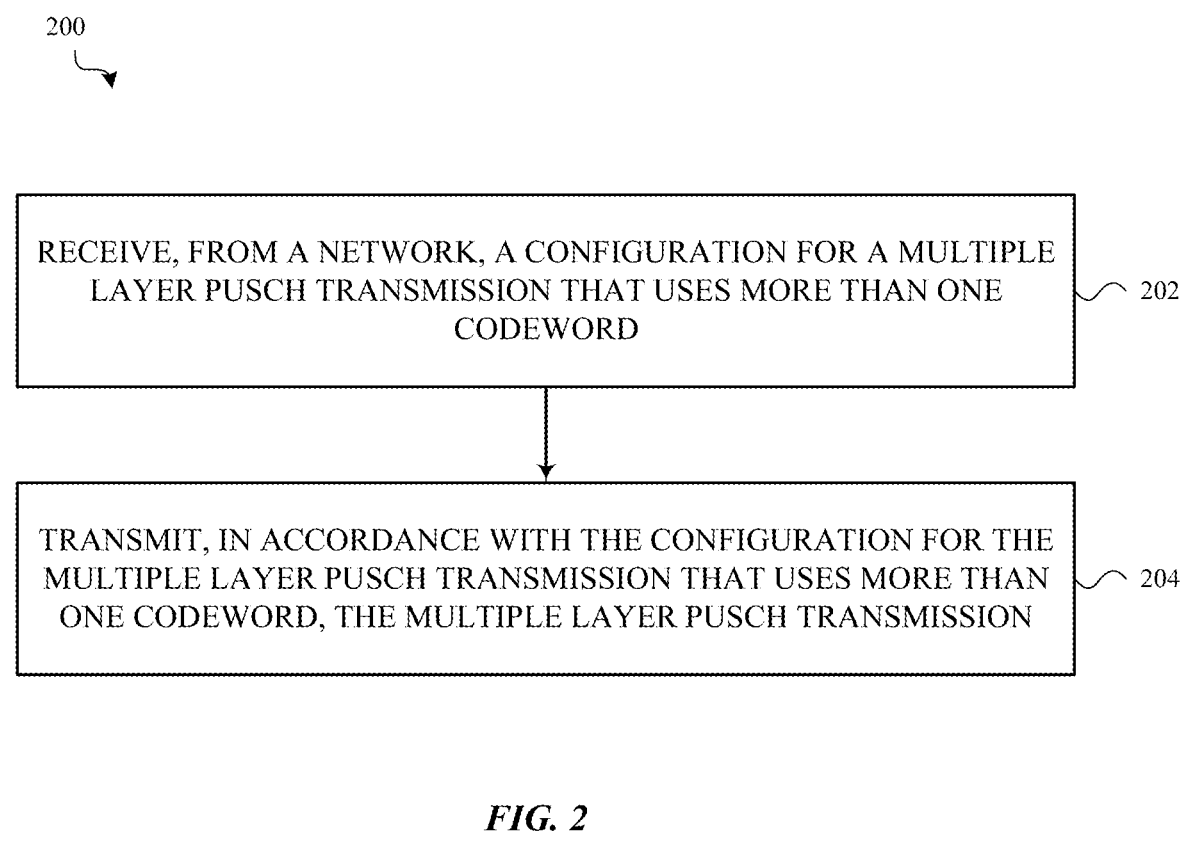

200

RECEIVE, FROM A NETWORK, A CONFIGURATION FOR A MULTIPLE LAYER PUSCH TRANSMISSION THAT USES MORE THAN ONE CODEWORD ⟍⟋ 202

TRANSMIT, IN ACCORDANCE WITH THE CONFIGURATION FOR THE MULTIPLE LAYER PUSCH TRANSMISSION THAT USES MORE THAN ONE CODEWORD, THE MULTIPLE LAYER PUSCH TRANSMISSION ⟍⟋ 204

*FIG. 2*

| NUMBER OF LAYERS | NUMBER OF CODEWORDS | LAYER-TO-CODEWORD MAPPING PRINCIPLE | LAYER-TO-CODEWORD MAPPING DETAIL |
|---|---|---|---|
| 1 | 1 | 1 LAYER MAPS TO FIRST CW | LAYER 0 <-> CW 0 |
| 2 | 1 | 2 LAYERS MAP TO FIRST CW | LAYER 0/1 <-> CW 0 |
| 3 | 1 | 3 LAYERS MAP TO FIRST CW | LAYER 0/1/2 <-> CW 0 |
| 4 | 1 | 4 LAYERS MAP TO FIRST CW | LAYER 0/1/2/3 <-> CW 0 |
| 5 | 2 | 2 LAYERS MAP TO FIRST CW<br>3 LAYERS MAP TO SECOND CW | LAYER 0/1 <-> CW 0<br>LAYER 2/3/4 <-> CW 1 |
| 6 | 2 | 3 LAYERS MAP TO FIRST CW<br>3 LAYERS MAP TO SECOND CW | LAYER 0/1/2 <-> CW 0<br>LAYER 3/4/5 <-> CW 1 |
| 7 | 2 | 3 LAYERS MAP TO FIRST CW<br>4 LAYERS MAP TO SECOND CW | LAYER 0/1/2 <-> CW 0<br>LAYER 3/4/5/6 <-> CW 1 |
| 8 | 2 | 4 LAYERS MAP TO FIRST CW<br>4 LAYERS MAP TO SECOND CW | LAYER 0/1/2/3 <-> CW 0<br>LAYER 4/5/6/7 <-> CW 1 |

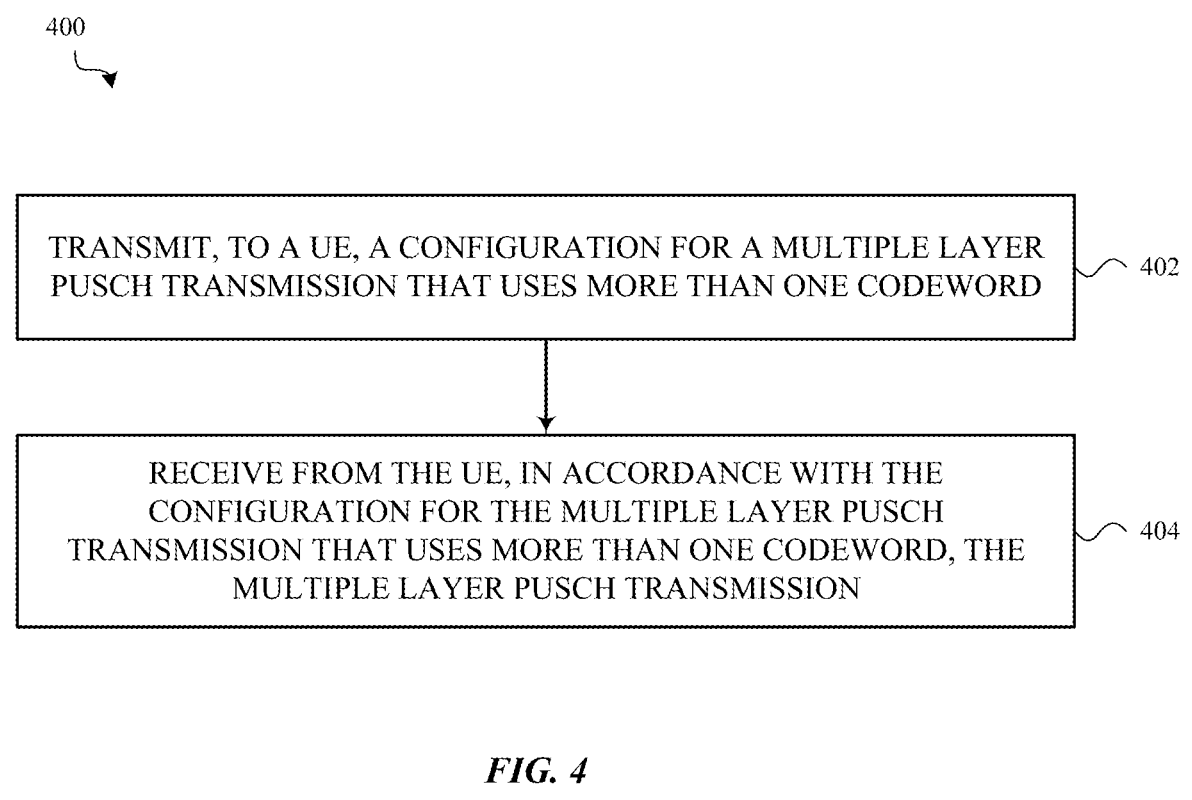

TRANSMIT, TO A UE, A CONFIGURATION FOR A MULTIPLE LAYER PUSCH TRANSMISSION THAT USES MORE THAN ONE CODEWORD      402

RECEIVE FROM THE UE, IN ACCORDANCE WITH THE CONFIGURATION FOR THE MULTIPLE LAYER PUSCH TRANSMISSION THAT USES MORE THAN ONE CODEWORD, THE MULTIPLE LAYER PUSCH TRANSMISSION      404

*FIG. 4*

MULTIPLE LAYER PHYSICAL UPLINK SHARED CHANNEL (PUSCH) TRANSMISSION THAT USES MORE THAN ONE CODEWORD

CROSS-REFERENCE TO RELATED APPLICATION

This application is a continuation of U.S. patent application Ser. No. 18/382,229, filed Oct. 20, 2023, which is a nonprovisional and claims the benefit under 35 U.S.C. § 119(e) of U.S. Provisional Patent Application No. 63/420,023, filed Oct. 27, 2022, the contents of which are incorporated herein by reference as if fully disclosed herein.

TECHNICAL FIELD

This application relates generally to wireless communication systems, including methods and apparatus for transmitting a physical uplink shared channel (PUSCH) on multiple layers.

BACKGROUND

Wireless mobile communication technology uses various standards and protocols to transmit data between a network device (e.g., a base station, a radio head, etc.) and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a network device of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the network device and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A network device used by a RAN may correspond to that RAN. One example of an E-UTRAN network device is an Evolved Universal Terrestrial Radio Access Network (E-UTRAN) Node B (also commonly denoted as evolved Node B, enhanced Node B, eNodeB, or eNB). One example of an NG-RAN network device is a next generation Node B (also sometimes referred to as a g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 2 shows an example method of wireless communication by a UE, according to embodiments described herein.

FIG. 3 shows an example predetermined mapping of layers to codewords.

FIG. 4 shows an example method of wireless communication by a network device, according to embodiments described herein.

DETAILED DESCRIPTION

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with a network. Therefore, the UE as described herein is used to represent any appropriate electronic device.

Figure 1:
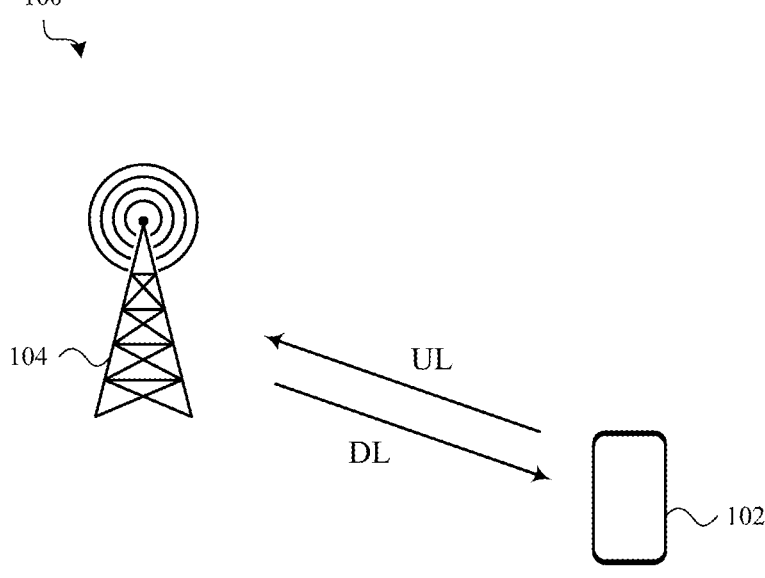
FIG. 1 shows an example wireless communication system, according to embodiments described herein.

FIG. 1 shows an example wireless communications system 100. The wireless communications system includes a UE 102 that is connected, over the air, to a network (e.g., a 3GPP network). The UE 102 may communicate with the network on an uplink (UL) and a downlink (DL), and more particularly may communicate with a network device 104 (e.g., a base station, a radio head, etc.) of a RAN on the UL and the DL.

In some embodiments, the UE 102 may include a set of antenna ports associated with one or more antenna panels, with each antenna panel including one or an array of antenna ports. Each antenna panel may be associated with a respective receive (Rx) chain and a respective transmit (Tx) chain. A UE having more than one antenna panel may be used to simultaneously receive DL transmissions having different angles of arrival (AoA) or simultaneously transmit UL transmissions having different angles of transmission (AoT).

In accordance with 3GPP NR, the UE 102 and network device 104 may support two modes of UL multiple input multiple output (MIMO) operation. A first mode may be used for codebook based PUSCH operation, and a second mode may be used for noncodebook based PUSCH operation. In accordance with codebook based PUSCH operation, the precoding and number of layers for a PUSCH transmission may be indicated by a "precoding information and number of layers" field in scheduling downlink control information (DCI). The possible precoding for the PUSCH transmission (i.e., the transmit precoding matrix indicator (TPMI)) is hardcoded in 3GPP Technical Specification (TS) 38.212. In accordance with noncodebook based PUSCH operation, the precoding and number of layers for a PUSCH transmission may be indicated by a sounding reference signal (SRS) resource indicator (SRI) field in scheduling DCI. The number of layers is the number of independent streams that a device (e.g., the UE 102 or the network device 104) can transmit or receive using spatial multiplexing, when operating in a MIMO mode.

Also in accordance with 3GPP NR, and for codebook based UL MIMO operation (e.g., codebook based PUSCH operation), three different coherency modes may be supported: Non-coherent (codebookSubset="nonCoherent"); Partial-coherent (codebookSubset="partialAndNonCoherent"); and Full-coherent (codebookSubset="fullyAndPartialAndNonCoherent").

Also in accordance with 3GPP NR, and for UL MIMO operation (e.g., PUSCH operation), a maximum of four Tx chains is supported, a maximum four layer PUSCH transmission is supported, and multiple layer PUSCH transmissions that use only one codeword (CW; i.e., one encoding chain in which a transport block (TB) may be encoded) are supported. Described herein are UEs and network devices (e.g., the UE 102 and network device 104) that support more than four Tx chains (e.g., eight Tx chains), more than four layer PUSCH transmission (e.g., eight layer PUSCH transmission), and multiple layer PUSCH transmissions that use more than one CW (e.g., two CWs). In some embodiments, the UEs that support more than four Tx chains, more than four layer PUSCH transmission, and multiple layer PUSCH transmissions that use more than one CW may be particular types of UEs, such as special purpose UEs deployed by a network operator, special purpose UEs deployed by a user or entity, certain types of computers, certain types of mobile phones or communication devices, and so on. Alternatively, any type of UE may support more than four Tx chains, more than four layer PUSCH transmission, and multiple layer PUSCH transmissions that use more than one CW.

An ability to transmit a multiple layer PUSCH transmission that uses more than one CW may increase a UE's complexity, but can improve both UE and network performance. Each CW may be associated with a separate modulation and coding scheme (MCS), which MCS can be adapted for a particular channel quality or signal-to-noise ratio (SNR) (or particular range of channel qualities or SNRs). If channel quality or SNR is relatively better, a higher MCS may be used and more information bits may be transmitted. If channel quality or SNR is relatively poorer, a lower MCS may be used, fewer information bits may be transmitted, and/or more redundant bits may be transmitted.

FIG. 2 shows an example method 200 of wireless communication by a UE. In some cases, the UE may be the UE described with reference to FIG. 1 or one of the other UEs described herein. The method 200 may be performed using a processor, a transceiver (e.g., a MIMO transceiver), or other components of the UE.

At 202, the method 200 may include receiving, from a network (e.g., from a network device (e.g., a base station, a radio head, etc.) of a RAN), a configuration for a multiple layer PUSCH transmission that uses more than one CW (i.e., a PUSCH transmission on multiple layers, in which different CWs are used for different subsets of one or more layers).

At 204, the method 200 may include transmitting, in accordance with the configuration for the multiple layer PUSCH transmission that uses more than one CW, the multiple layer PUSCH transmission. The multiple layer PUSCH transmission may be transmitted on at least a first layer (i.e., on a first subset of one or more layers) of the multiple layers using a first CW, and on at least a second layer (i.e., on a second subset of one or more layers) of the multiple layers using a second CW.

The method 200 may be variously embodied, extended, or adapted, as described in the following paragraphs and elsewhere in this description. Also, although embodiments described herein are sometimes described in terms of a UE that transmits a multiple layer PUSCH transmission on up to eight layers, using up to two CWs, the described embodiments are examples only, and it is contemplated that the techniques described herein may be extended to transmit a multiple layer PUSCH transmission on more than eight layers, using more than two CWs.

In some examples of the method 200, a standard or specification may specify, or the network may indicate, that multiple layer PUSCH transmissions that use more than one CW are only supported for PUSCH transmissions on more than a threshold number of layers (e.g., more than four layers). In other words, multiple layer PUSCH transmissions on fewer than the threshold number of layers (e.g., four or fewer layers) may be required to use one CW. Thus, the multiple layer PUSCH transmission transmitted at 204 may be transmitted on more than four layers. This is the same stipulation that is currently placed on multiple layer DL transmissions.

In some examples of the method 200, a standard or specification may specify, or the network may indicate, that multiple layer PUSCH transmissions that use more than one CW are supported for any number of layers. Thus, the multiple layer PUSCH transmission transmitted at 204 may be transmitted on four or fewer layers. This may be helpful when there are a smaller number of layers, but the layers are nonetheless associated with very different channel qualities or SNRs, such that a single MCS may be too conservative for some layers or too ambitious for other layers.

In some cases, all UEs may not be required to support multiple layer PUSCH transmission that uses more than one CW. For example, only certain types of UEs may support multiple layer PUSCH transmission. In some cases, a UE that supports multiple layer PUSCH transmission that uses more than one CW may be required to support 1) multiple layer PUSCH transmission that uses more than one CW for PUSCH transmissions on more than a threshold number of layers, and optionally support 2) multiple layer PUSCH transmission that uses more than one CW for any number of layers.

In some cases, the maximum number of CWs that can be scheduled by the network for UL operation (e.g., PUSCH transmission) may be configured by the network. In some cases, the maximum number of CWs that the network can schedule for PUSCH transmission may be configured in a PUSCH configuration (e.g., PUSCH-Config), in radio resource control (RRC) signaling. For instance, in some examples, the method 200 may include receiving, from the network, an indication of a maximum rank (e.g., the maxRank in PUSCH-Config) for PUSCH transmission. The method 200 may further include determining, at least partly based on the indication of the maximum rank for PUSCH transmission indicating a maximum rank for PUSCH transmission that satisfies a threshold rank, that the network can schedule the PUSCH transmission at 204 (or any PUSCH transmission) using more than one CW (or, e.g., two CWs). In other words, the UE may compare the indication of the maximum rank for PUSCH transmission to the threshold rank and determine that the network can schedule the PUSCH transmission that uses more than one CW when the indicated maximum rank is greater than the threshold rank.

In these examples, the configuration received at 202 may be received after the UE determines that the network can schedule PUSCH transmission that uses more than one CW (or the configuration received at 202 may only be sent, by the network, after the network transmits the maximum rank for PUSCH transmission). In some examples, the threshold rank may be four. For example, if maxRank<=4, the network may schedule a maximum of one CW for a multiple layer PUSCH transmission, and if maxRank>4, the network may schedule a maximum of two CWs for a multiple layer PUSCH transmission.

In some examples, the method 200 may include receiving, from the network, an indication that the network can schedule the PUSCH transmission that uses more than one CW. In these examples, the configuration received at 202 may be received after the UE receives the indication that the network can schedule the PUSCH transmission (or any PUSCH transmission) that uses more than one CW (or the configuration received at 202 may only be sent, by the network, after the network transmits the indication that the network can schedule the PUSCH transmission that uses more than one CW). In some cases, the indication may be an indication of the maximum number of CWs that the network can schedule for PUSCH transmission. In some cases, a new information element (IE) (e.g., a maxNrofCodeWordsScheduledByDCI IE) may be introduced in RRC signaling (e.g., in the PUSCH-Config of RRC signaling) to indicate the maximum number of CWs that the network can schedule for PUSCH transmission. The examples described in this paragraph may provide more flexibility than tying the maximum number of CWs that the network can configure for a PUSCH transmission to the maximum rank for PUSCH transmission.

Regardless of how the network indicates that it can schedule a PUSCH transmission that uses more than one CW, the network may schedule a PUSCH transmission with fewer CWs than an indicated maximum number of CWs.

In some examples of the method 200, the previously-described maxRank or maxNrofCodeWordsScheduled-ByDCI may be updated by means of a medium access control (MAC) control element (MAC CE) or DCI, instead of RRC signaling.

In some examples, the method 200 may include transmitting, to the network, UE capability information indicating support for multiple layer PUSCH transmissions that use more than one CW. In these examples, the configuration for the multiple layer PUSCH transmission may be received at least partly in response to the network's receipt of the UE capability information. In some cases, the UE capability information may indicate a type of the UE, or whether the UE has determined to support multiple layer PUSCH transmission. In some cases, the UE may indicate that it does not support multiple layer PUSCH transmission. In some cases, the UE may receive, from the network, a request that the UE support multiple layer PUSCH transmission. The UE may or may not be allowed to reject the request (assuming that the UE has the ability to support multiple layer PUSCH transmission).

In some examples, a standard or specification may specify a predetermined mapping of layers to CWs for PUSCH transmissions on different numbers of layers, and the method 200 may include determining, from the predetermined mapping, a mapping of different layers of the multiple layer PUSCH transmission (transmitted at 204) to the more than one CW. By way of example, FIG. 3 shows an example predetermined mapping 300 of layers to CWs 302, 304 for PUSCH transmissions on different numbers of layers 306. In the example predetermined mapping 300, a PUSCH transmission on four (4) layers is mapped, at 302/304, to one CW (i.e., all 4 layers are mapped to one CW (a first CW)); a PUSCH transmission on seven (7) layers is mapped, at 302/304, to two CWs, with layers 0/1/2 mapped to a first CW, and with layers 3/4/5/6 mapped to a second CW; and a PUSCH transmission on eight (8) layers is mapped, at 302/304, to two CWs, with layers 0/1/2/3 mapped to a first CW, and with layers 4/5/6/7 mapped to a second CW.

In some examples, the network may configure a mapping of layers to CWs for PUSCH transmissions on different numbers of layers (or a mapping of different layers of the PUSCH transmission (transmitted at 204) to the more than one CW). In some of these examples, the method 200 may include receiving, from the network, a configured mapping of layers to CWs for PUSCH transmissions on different numbers of layers, and determining, from the configured mapping, a mapping of different layers of the multiple layer PUSCH transmission to the more than one CW. In other examples, the method 200 may include receiving, from the network, a configured mapping of different layers of the multiple layer PUSCH transmission (transmitted at 204) to the more than one CW. In these latter examples, the network does not have to configure and transmit, to the UE, a mapping of all possible numbers of layers to CWs. However, the network may have to configure and transmit a mapping of layers to CWs for each multiple layer PUSCH transmission that the UE needs to transmit. That said, the network may change the mapping of layers to CWs for each multiple layer PUSCH transmission (or for different subsets of multiple layer PUSCH transmissions made at similar times and/or under similar channel conditions).

The network may configure how layers are mapped to CWs in different ways. In some examples, the method 200 may include receiving, from the network, an indication of a number of layers mapped to at least one CW of the more than one CW. In these examples, the method 200 may also include determining, based at least partly on the number of layers mapped to the at least one CW of the more than one CW, a number of layers of the multiple layer PUSCH transmission that is mapped to each CW of the more than one CW. For instance, for a multiple layer PUSCH transmission that uses two CWs (i.e., a first CW and a second CW), the network may indicate that 2 layers map to the first CW and 4 layers map to the second CW. Alternatively, the network may indicate that 3 layers map to the first CW and 3 layers map to the second CW. Other mappings are also possible. In some cases, the network may map layers to CWs by determining the channel conditions or SNRs associated with different layers, and then mapping layers associated with similar channel conditions or SNRs to a same CW. As another example, the network may indicate a number of layers that map to a first CW, and the UE may infer that the remaining layers are mapped to a second CW.

In some examples, the method 200 may include receiving, from the network, a configured mapping of layers to CWs for a codebook based PUSCH transmission. In these examples, and in some cases, the layers may be configured or indicated by more than one TPMI. For example, the layers associated with a first TPMI may be mapped to a first CW, and the layers associated with a second TPMI may be mapped to a second CW.

In some examples, the method 200 may include receiving, from the network, a configured mapping of layers to CWs for a noncodebook based PUSCH transmission. In these examples, and in some cases, the layers may be configured or indicated by more than one SRI. For example, the layers associated with a first SRI may be mapped to a first CW, and the layers associated with a second SRI may be mapped to a second CW.

In some examples, the method 200 may include receiving, from the network, a configured mapping of layers to CWs in terms of actual layers and actual CWs. In this manner, the mapping may be dynamically and particularly changed based on changing channel conditions or SNRs. For example, for a first multiple layer PUSCH transmission that uses more than one CW, the network may map layers ($l_0$, $l_1$, $l_2$) to a first CW and map layers ($l_3$, $l_4$, $l_5$) to a second CW. For a second multiple layer PUSCH transmission that uses more than one CW, the network may map layers ($l_0$, $l_1$, $l_5$) to a first CW and map layers ($l_2$, $l_3$, $l_4$) to a second CW. Layers may also be mapped to more than one CW in other ways, and in ways that cannot be indicated by means of TPMIs or SRIs, which cannot guarantee that the channel strengths of different layers are ordered monotonically.

In some cases, one or more additional fields may be introduced into UL scheduling DCI (e.g., DCI Format 0_1 or DCI Format 0_2). In these cases, the configuration for the multiple layer PUSCH transmission that uses more than one CW, received at 202, may include DCI, and the DCI may include various fields or indicators. For example, the DCI may include a first indicator of a first MCS for the first CW, and a second indicator of a second MCS for the second CW. In some cases, the first indicator may be a legacy indicator (e.g., an indicator for a PUSCH transmission that uses a single CW), and the second indicator may be a new indicator, possibly contained in a new field of DCI. The first and second MCSs may be the same or different, depending on the channel conditions or SNR of the layers on which the multiple layer PUSCH transmission that uses more than one CW will be transmitted.

As another example, the DCI may additionally or alternatively include a new data indicator. The new data indictor may indicate whether a transport block, carried by the second CW, is a new transmission or a retransmission. In some cases, the new data indicator may be contained in a new field of DCI.

As another example, the DCI may additionally or alternatively include a first indicator of a first redundancy version (RV) for the first CW, and a second indicator of a second RV for the second CW. In some cases, the first indicator may be a legacy indicator (e.g., an indicator for a PUSCH transmission that uses a single CW), and the second indicator may be a new indicator, possibly contained in a new field of DCI. The first and second RVs may be the same or different. When the DCI is received in accordance with DCI Format 0_2 (i.e., compact DCI), and in some cases, the first indicator and the second indicator may have a same number of bits or a different number of bits.

In some cases, one or more additional fields may be introduced into a configured grant (CG) configuration (e.g., in the ConfiguredGrantConfig included in RRC signaling). The CG configuration may be part of the configuration for the multiple layer PUSCH transmission that uses more than one CW, received at 202. The CG configuration may include, for example, a first indicator of a first MCS, and a second indicator of a second MCS. The first MCS may be for the first CW, and the second MCS may be for the second CW. In some cases, the first indicator may be a legacy indicator (e.g., an indicator for a PUSCH transmission that uses a single CW), and the second indicator may be a new indicator, possibly contained in a new field of the CG configuration. The first and second MCSs may be the same or different, depending on the channel conditions or SNR of the layers on which the multiple layer PUSCH transmission that uses more than one CW will be transmitted.

In various embodiments of the method 200, the UE may be configured to support differing numbers of UL hybrid automatic repeat request (HARQ) processes, or a different maximum number of UL HARQ processes. In examples in which the more than one CW used for the multiple layer PUSCH transmission is two CWs, the method 200 may include supporting, for the multiple layer PUSCH transmission that uses more than one CW, at least sixteen UL HARQ processes per component carrier (CC). In some cases, the UE may be mandated to support a maximum of sixteen UL HARQ processes (e.g., because of a standard or specification, or because of a configuration indicated by the network). This may require more memory than other options, but may configure the UE's UL similar to the UE's DL.

Alternatively, in examples in which the more than one CW used for the multiple layer PUSCH transmission is two CWs, the method 200 may include supporting, for the multiple layer PUSCH transmission that uses more than one CW, at least eight UL HARQ processes per CC. In some cases, the UE may be mandated to support a maximum of eight UL HARQ processes (e.g., because of a standard or specification, or because of a configuration indicated by the network). In these examples, the method 200 may include indicating, to the network, whether the UE is capable of supporting a maximum of sixteen UL HARQ processes. In some cases, the method 200 may include reporting, to the network, support of sixteen UL HARQ processes per feature set per component carrier (FSPC) (e.g., per CC per band per band combination (BC)). In some cases, the method 200 may include reporting, to the network, support of sixteen UL HARQ processes per band, and also reporting, to the network, a maximum total number of UL HARQ processes supported across all CCs per BC.

In some embodiments, the UE may multiplex or transmit uplink control information (UCI) on the multiple layer PUSCH transmission that uses more than one CW. The UCI may include, for example, HARQ acknowledgement (HARQ-ACK) information, scheduling request (SR) information, configured grant (CG) UCI (CG-UCI), and/or channel state information (CSI). In some examples, the method 200 may include transmitting the UCI across all layers of the multiple layer PUSCH transmission (i.e., across each of the more than one CW).

In some examples, the method 200 may include dividing the UCI into a number of portions equal to the number of CWs used to transmit the multiple layer PUSCH transmission. For example, if the multiple layer PUSCH transmission is transmitted using only two CWs (i.e., the first CW and the second CW), the UCI may be split into a first portion and a second portion. In these examples, the method 200 may further include transmitting the first portion across all layers of the first CW, and transmitting the second portion across all layers of the second CW. In some cases, the UCI may be divided into roughly equal size portions (especially if a roughly equal number of layers is mapped to each of the first and second CWs).

In some examples, the method 200 may include transmitting the UCI across all layers of only one CW of the more than one CW used to transmit the multiple layer PUSCH transmission. For example, if the multiple layer PUSCH transmission is transmitted using two CWs (i.e., a first CW and a second CW), the UCI may be transmitted across all layers of only the first CW or only the second CW. In some cases, the UCI may be transmitted across all layers of the CW associated with the best channel qualities or best SNRs.

In other cases, the UCI may be transmitted across all layers of a CW associated with less than the best channel qualities or best SNRs. In other cases, the UCI may be transmitted across all layers of a CW associated with the largest TB size. In other cases, the UCI may be transmitted across all layers of a CW associated with the highest MCS.

FIG. 4 shows an example method 400 of wireless communication by a network device (e.g., a network device of a RAN (e.g., a base station, a radio head, etc.). In some cases, the network device may be one of the network devices described with reference to FIG. 1 or one of the other network devices described herein. The method 400 may be performed using a processor, a transceiver, or other components of the network device.

At 402, the method 400 may include transmitting, to a UE, a configuration for a multiple layer PUSCH transmission that uses more than one CW (i.e., a PUSCH transmission on multiple layers, in which different CWs are used for different subsets of one or more layers).

At 404, the method 400 may include receiving, in accordance with the configuration for the multiple layer PUSCH transmission that uses more than one CW, the multiple layer PUSCH transmission. The multiple layer PUSCH transmission may be received on at least a first layer (i.e., on a first subset of one or more layers) of the multiple layers using a first CW of the more than one CW, and on at least a second layer (i.e., on a second subset of one or more layers) of the multiple layers using a second CW of the more than one CW.

The method 400 may be variously embodied, extended, or adapted, as described with reference to FIGS. 2 and 3, in the following paragraphs, and elsewhere in this description. Also, although embodiments described herein are sometimes described in terms of a network device that receives a multiple layer PUSCH transmission on up to eight layers, using up to two CWs, the described embodiments are examples only, and it is contemplated that the techniques described herein may be extended to receive a multiple layer PUSCH transmission on more than eight layers, using more than two CWs.

Embodiments contemplated herein include one or more non-transitory computer-readable media storing instructions to cause an electronic device, upon execution of the instructions by one or more processors of the electronic device, to perform one or more elements of the method 200 or 400. In the context of method 200, this non-transitory computer-readable media may be, for example, a memory of a UE (such as a memory 606 of a wireless device 602 that is a UE, as described herein). In the context of method 400, this non-transitory computer-readable media may be, for example, a memory of a network device (such as a memory 624 of a network device 620, as described herein).

Embodiments contemplated herein include an apparatus having logic, modules, or circuitry to perform one or more elements of the method 200 or 400. In the context of method 200, this apparatus may be, for example, an apparatus of a UE (such as a wireless device 602 that is a UE, as described herein). In the context of method 400, this apparatus may be, for example, an apparatus of a network device (such as a network device 620, as described herein).

Embodiments contemplated herein include an apparatus having one or more processors and one or more computer-readable media, using or storing instructions that, when executed by the one or more processors, cause the one or more processors to perform one or more elements of the method 200 or 400. In the context of method 200, this apparatus may be, for example, an apparatus of a UE (such as a wireless device 602 that is a UE, as described herein).

In the context of the method 400, this apparatus may be, for example, an apparatus of a network device (such as a network device 620, as described herein).

Embodiments contemplated herein include a signal as described in or related to one or more elements of the method 200 or 400.

Embodiments contemplated herein include a computer program or computer program product having instructions, wherein execution of the program by a processor causes the processor to carry out one or more elements of the method 200 or 400. In the context of method 200, the processor may be a processor of a UE (such as a processor(s) 604 of a wireless device 602 that is a UE, as described herein), and the instructions may be, for example, located in the processor and/or on a memory of the UE (such as a memory 606 of a wireless device 602 that is a UE, as described herein). In the context of method 400, the processor may be a processor of a network device (such as a processor(s) 622 of a network device 620, as described herein), and the instructions may be, for example, located in the processor and/or on a memory of the network device (such as a memory 624 of a network device 620, as described herein).

Figure 5:
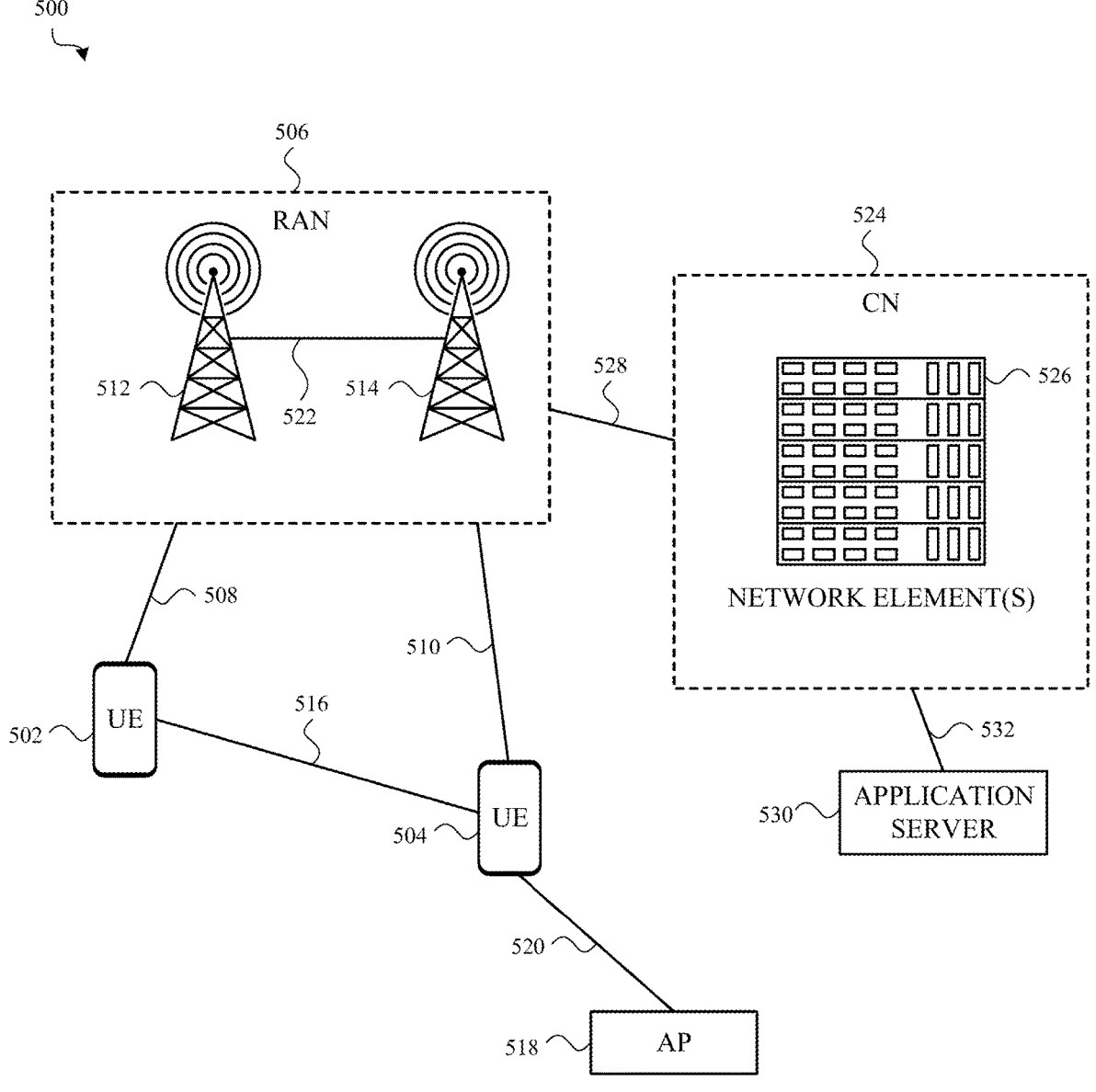
FIG. 5 illustrates an example architecture of a wireless communication system, according to embodiments described herein.

FIG. 5 illustrates an example architecture of a wireless communication system, according to embodiments described herein. The following description is provided for an example wireless communication system 500 that operates in conjunction with the LTE system standards or specifications and/or 5G or NR system standards or specifications, as provided by 3GPP technical specifications.

As shown by FIG. 5, the wireless communication system 500 includes UE 502 and UE 504 (although any number of UEs may be used). In this example, the UE 502 and the UE 504 are illustrated as smartphones (e.g., handheld touch-screen mobile computing devices connectable to one or more cellular networks), but may also comprise any mobile or non-mobile computing device configured for wireless communication.

The UE 502 and UE 504 may be configured to communicatively couple with a RAN 506. In embodiments, the RAN 506 may be NG-RAN, E-UTRAN, etc. The UE 502 and UE 504 utilize connections (or channels) (shown as connection 508 and connection 510, respectively) with the RAN 506, each of which comprises a physical communications interface. The RAN 506 can include one or more network devices, such as base station 512 and base station 514, that enable the connection 508 and connection 510.

In this example, the connection 508 and connection 510 are air interfaces to enable such communicative coupling, and may be consistent with RAT(s) used by the RAN 506, such as, for example, an LTE and/or NR.

In some embodiments, the UE 502 and UE 504 may also directly exchange communication data via a sidelink interface 516. The UE 504 is shown to be configured to access an access point (shown as AP 518) via connection 520. By way of example, the connection 520 can comprise a local wireless connection, such as a connection consistent with any IEEE 802.11 protocol, wherein the AP 518 may comprise a Wi-Fi® router. In this example, the AP 518 may be connected to another network (for example, the Internet) without going through a CN 524.

In embodiments, the UE 502 and UE 504 can be configured to communicate using orthogonal frequency division multiplexing (OFDM) communication signals with each other or with the base station 512 and/or the base station 514 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 512 or base station 514 may be implemented as one or more software entities running on server computers as part of a virtual network. In addition, or in other embodiments, the base station 512 or base station 514 may be configured to communicate with one another via interface 522. In embodiments where the wireless communication system 500 is an LTE system (e.g., when the CN 524 is an EPC), the interface 522 may be an X2 interface. The X2 interface may be defined between two or more network devices of a RAN (e.g., two or more eNBs and the like) that connect to an EPC, and/or between two eNBs connecting to the EPC. In embodiments where the wireless communication system 500 is an NR system (e.g., when CN 524 is a 5GC), the interface 522 may be an Xn interface. The Xn interface is defined between two or more network devices of a RAN (e.g., two or more gNBs and the like) that connect to the 5GC, between a base station 512 (e.g., a gNB) connecting to the 5GC and an eNB, and/or between two eNBs connecting to the 5GC (e.g., CN 524).

The RAN 506 is shown to be communicatively coupled to the CN 524. The CN 524 may comprise one or more network elements 526, which are configured to offer various data and telecommunications services to customers/subscribers (e.g., users of UE 502 and UE 504) who are connected to the CN 524 via the RAN 506. The components of the CN 524 may be implemented in one physical device or separate physical devices including components to read and execute instructions from a machine-readable or computer-readable medium (e.g., a non-transitory machine-readable storage medium).

In embodiments, the CN 524 may be an EPC, and the RAN 506 may be connected with the CN 524 via an S1 interface 528. In embodiments, the S1 interface 528 may be split into two parts, an S1 user plane (S1-U) interface, which carries traffic data between the base station 512 or base station 514 and a serving gateway (S-GW), and the S1-MME interface, which is a signaling interface between the base station 512 or base station 514 and mobility management entities (MMEs).

In embodiments, the CN 524 may be a 5GC, and the RAN 506 may be connected with the CN 524 via an NG interface 528. In embodiments, the NG interface 528 may be split into two parts, an NG user plane (NG-U) interface, which carries traffic data between the base station 512 or base station 514 and a user plane function (UPF), and the S1 control plane (NG-C) interface, which is a signaling interface between the base station 512 or base station 514 and access and mobility management functions (AMFs).

Generally, an application server 530 may be an element offering applications that use internet protocol (IP) bearer resources with the CN 524 (e.g., packet switched data services). The application server 530 can also be configured to support one or more communication services (e.g., VoIP sessions, group communication sessions, etc.) for the UE 502 and UE 504 via the CN 524. The application server 530 may communicate with the CN 524 through an IP communications interface 532.

Figure 6:
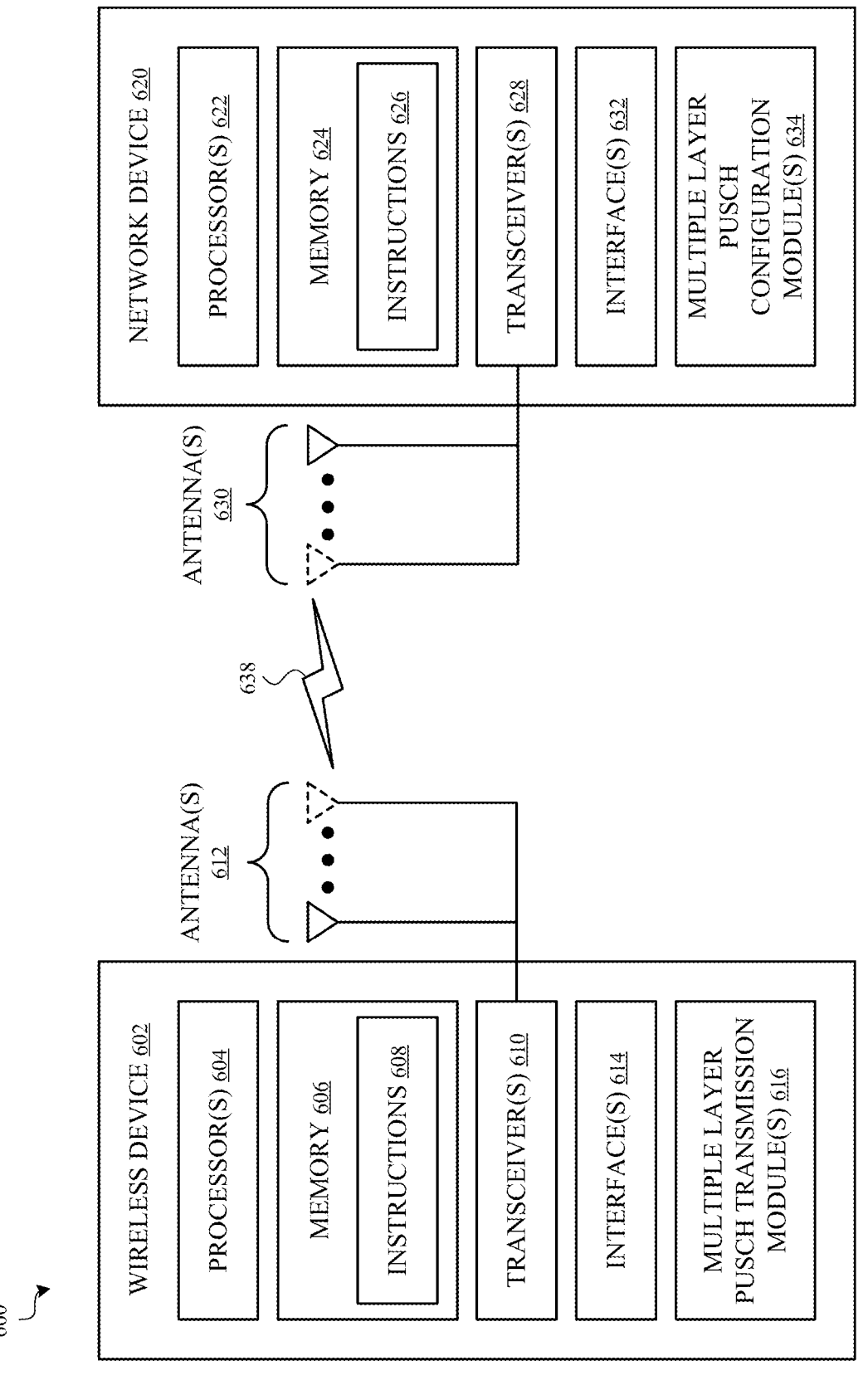
FIG. 6 illustrates an example system for performing signaling between a wireless device and a network device, according to embodiments described herein.

FIG. 6 illustrates an example system 600 for performing signaling 638 between a wireless device 602 and a network device 620, according to embodiments described herein. The system 600 may be a portion of a wireless communication system as herein described. The wireless device 602 may be, for example, a UE of a wireless communication system. The network device 620 may be, for example, a base station (e.g., an eNB or a gNB) or a radio head of a wireless communication system.

The wireless device 602 may include one or more processor(s) 604. The processor(s) 604 may execute instructions such that various operations of the wireless device 602 are performed, as described herein. The processor(s) 604 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 602 may include a memory 606. The memory 606 may be a non-transitory computer-readable storage medium that stores instructions 608 (which may include, for example, the instructions being executed by the processor(s) 604). The instructions 608 may also be referred to as program code or a computer program. The memory 606 may also store data used by, and results computed by, the processor(s) 604.

The wireless device 602 may include one or more transceiver(s) 610 (also collectively referred to as a transceiver 610) that may include radio frequency (RF) transmitter and/or receiver circuitry that use the antenna(s) 612 of the wireless device 602 to facilitate signaling (e.g., the signaling 638) to and/or from the wireless device 602 with other devices (e.g., the network device 620) according to corresponding RATs.

The wireless device 602 may include one or more antenna(s) 612 (e.g., one, two, four, eight, or more). For embodiments with multiple antenna(s) 612, the wireless device 602 may leverage the spatial diversity of such multiple antenna(s) 612 to send and/or receive multiple different data streams on the same time and frequency resources. This behavior may be referred to as, for example, MIMO behavior (referring to the multiple antennas used at each of a transmitting device and a receiving device that enable this aspect). MIMO transmissions by the wireless device 602 may be accomplished according to precoding (or digital beamforming) that is applied at the wireless device 602 that multiplexes the data streams across the antenna(s) 612 according to known or assumed channel characteristics such that each data stream is received with an appropriate signal strength relative to other streams and at a desired location in the spatial domain (e.g., the location of a receiver associated with that data stream). Some embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In some embodiments having multiple antennas, the wireless device 602 may implement analog beamforming techniques, whereby phases of the signals sent by the antenna(s) 612 are relatively adjusted such that the (joint) transmission of the antenna(s) 612 can be directed (this is sometimes referred to as beam steering).

The wireless device 602 may include one or more interface(s) 614. The interface(s) 614 may be used to provide input to or output from the wireless device 602. For example, a wireless device 602 that is a UE may include interface(s) 614 such as microphones, speakers, a touch-screen, buttons, and the like in order to allow for input and/or output to the UE by a user of the UE. Other interfaces of such a UE may be made up of transmitters, receivers, and other circuitry (e.g., other than the transceiver(s) 610/antenna(s) 612 already described) that allow for communication between the UE and other devices and may operate according to known protocols (e.g., Wi-Fi®, Bluetooth®, and the like).

The wireless device 602 may include multiple layer PUSCH transmission module(s) 616. The multiple layer PUSCH transmission module(s) 616 may be implemented via hardware, software, or combinations thereof. For example, the multiple layer PUSCH transmission module(s) 616 may be implemented as a processor, circuit, and/or instructions 608 stored in the memory 606 and executed by the processor(s) 604. In some examples, the multiple layer PUSCH transmission module(s) 616 may be integrated within the processor(s) 604 and/or the transceiver(s) 610. For example, the multiple layer PUSCH transmission module(s) 616 may be implemented by a combination of software components (e.g., executed by a DSP or a general processor) and hardware components (e.g., logic gates and circuitry) within the processor(s) 604 or the transceiver(s) 610.

The multiple layer PUSCH transmission module(s) 616 may be used for various aspects of the present disclosure, for example, aspects of FIGS. 1-4, from a wireless device or UE perspective. The multiple layer PUSCH transmission module(s) 616 may be configured to, for example, transmit to the network device 620 a multiple layer PUSCH transmission that uses more than one CW.

The network device 620 may include one or more processor(s) 622. The processor(s) 622 may execute instructions such that various operations of the network device 620 are performed, as described herein. The processor(s) 622 may include one or more baseband processors implemented using, for example, a CPU, a DSP, an ASIC, a controller, an FPGA device, another hardware device, a firmware device, or any combination thereof configured to perform the operations described herein.

The network device 620 may include a memory 624. The memory 624 may be a non-transitory computer-readable storage medium that stores instructions 626 (which may include, for example, the instructions being executed by the processor(s) 622). The instructions 626 may also be referred to as program code or a computer program. The memory 624 may also store data used by, and results computed by, the processor(s) 622.

The network device 620 may include one or more transceiver(s) 628 (also collectively referred to as a transceiver 628) that may include RF transmitter and/or receiver circuitry that use the antenna(s) 630 of the network device 620 to facilitate signaling (e.g., the signaling 638) to and/or from the network device 620 with other devices (e.g., the wireless device 602) according to corresponding RATs.

The network device 620 may include one or more antenna(s) 630 (e.g., one, two, four, or more). In embodiments having multiple antenna(s) 630, the network device 620 may perform MIMO, digital beamforming, analog beamforming, beam steering, etc., as has been described.

The network device 620 may include one or more interface(s) 632. The interface(s) 632 may be used to provide input to or output from the network device 620. For example, a network device 620 of a RAN (e.g., a base station, a radio head, etc.) may include interface(s) 632 made up of transmitters, receivers, and other circuitry (e.g., other than the transceiver(s) 628/antenna(s) 630 already described) that enables the network device 620 to communicate with other equipment in a network, and/or that enables the network device 620 to communicate with external networks, computers, databases, and the like for purposes of operations, administration, and maintenance of the network device 620 or other equipment operably connected thereto.

The network device 620 may include one or more multiple layer PUSCH configuration module(s) 634. The multiple layer PUSCH configuration module(s) 634 may be implemented via hardware, software, or combinations thereof. For example, the multiple layer PUSCH configuration module(s) 634 may be implemented as a processor, circuit, and/or instructions 626 stored in the memory 624 and executed by the processor(s) 622. In some examples, the multiple layer PUSCH configuration module(s) 634 may be integrated within the processor(s) 622 and/or the transceiver(s) 628. For example, the multiple layer PUSCH configuration module(s) 634 may be implemented by a combination of software components (e.g., executed by a DSP or a general processor) and hardware components (e.g., logic gates and circuitry) within the processor(s) 622 or the transceiver(s) 628.

The multiple layer PUSCH configuration module(s) 634 may be used for various aspects of the present disclosure, for example, aspects of FIGS. 1-4, from a network device perspective. The multiple layer PUSCH configuration module(s) 634 may be configured to, for example, configure a multiple layer PUSCH transmission that uses more than one CW.

For one or more embodiments, at least one of the components set forth in one or more of the preceding figures may be configured to perform one or more operations, techniques, processes, and/or methods as set forth herein. For example, a baseband processor (or processor) as described herein in connection with one or more of the preceding figures may be configured to operate in accordance with one or more of the examples set forth herein. For another example, circuitry associated with a UE, network device, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form described. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

The systems described herein pertain to specific embodiments but are provided as examples. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. An apparatus comprising a memory coupled to a processor, the
processor configured to;
 receive, from a network, a configuration for a multiple layer physical uplink shared channel (PUSCH) transmission that uses more than one codeword;
 receive, from the network, an indication of a number of layers mapped to at least one codeword of the more than one codeword;
 determine, based at least partly on the number of layers mapped to the at least one codeword of the more than one codeword, a number of layers of the multiple layer PUSCH transmission that is mapped to each codeword of the more than one codeword; and
 transmit, in accordance with the configuration for the multiple layer PUSCH transmission that uses more than one codeword, the multiple layer PUSCH transmission, the multiple layer PUSCH transmission transmitted on at least a first layer of multiple layers using the first codeword of the more than one codeword, and on at least a second layer of the multiple layers using a second codeword of the more than one codeword.

2. The apparatus of claim 1, wherein the multiple layer PUSCH transmission is a PUSCH transmission on more than four layers.

3. The apparatus of claim 1, wherein the UE supports eight transmit chains.

4. The apparatus of claim 1, wherein the configuration for the multiple layer PUSCH transmission that uses more than one codeword comprises downlink control information (DCI) including:
 a first indicator of a first modulation and coding scheme for the first codeword; and
 a second indicator of a second modulation and coding scheme for the second codeword.

5. The apparatus of claim 4, wherein the first indicator of the first modulation and coding scheme and the second indicator of the second modulation and coding scheme are received in different fields of the DCI.

6. The apparatus of claim 1, wherein the configuration for the multiple layer PUSCH transmission that uses more than one codeword comprises downlink control information (DCI) including a new data indicator that indicates whether a transport block carried by the second codeword is a new transmission or a retransmission.

7. The apparatus of claim 1, wherein the configuration for the multiple layer PUSCH transmission that uses more than one codeword comprises downlink control information (DCI) including:
 a first indicator of a first redundancy version for the first codeword; and
 a second indicator of a second redundancy version for the second codeword.

8. The apparatus of claim 1, wherein the processor is configured to transmit uplink control information (UCI) on only one codeword of the more than one codeword.

9. The apparatus of claim 8, wherein the processor is configured to multiplex UCI on the only one codeword.

10. The apparatus of claim 8, wherein the processor is configured to transmit the UCI across all layers of the only one codeword.

11. The apparatus of claim 8, wherein the processor is configured to select the only one codeword, from between the first codeword and the second codeword, as a codeword associated with a best channel quality.

12. The apparatus of claim 8, wherein the processor is configured to select the only one codeword, from between the first codeword and the second codeword, as a codeword associated with a best signal-to-noise ratio.

13. The apparatus of claim 1, wherein:
 the indication of the number of layers mapped to at least one codeword of the more than one codeword comprises an indication of a first number of layers mapped to the first codeword; and
 determining the number of layers of the multiple layer PUSCH transmission that is mapped to each codeword of the more than one codeword comprises determining, based at least partly on the first number of layers mapped to the first codeword, a second number of layers of the multiple layer PUSCH transmission that is mapped to the second codeword.

14. An apparatus comprising a memory coupled to a processor, the
processor configured to:
 generate, for transmission to a user equipment (UE), a configuration for a multiple layer physical uplink shared channel (PUSCH) transmission using more than one codeword;
 configure, for transmission to the UE, an indication of a number of layers mapped to at least one codeword of the more than one codeword; and
 receive from the UE, in accordance with the configuration for the multiple layer PUSCH transmission that uses more than one codeword, the multiple layer PUSCH transmission, the multiple layer PUSCH transmission received on at least a first layer of multiple layers using a first codeword of the more than one codeword, and on at least a second layer of the multiple layers using a second codeword of the more than one codeword.

15. The apparatus of claim 14, wherein the multiple layer PUSCH transmission is a PUSCH transmission on more than four layers.

16. The apparatus of claim 14, wherein the configuration for the multiple layer PUSCH transmission that uses more than one codeword comprises downlink control information (DCI) including:

a first indicator of a first modulation and coding scheme for the first codeword; and a second indicator of a second modulation and coding scheme for the second codeword.

17. The apparatus of claim 14, wherein the processor is configured to receive uplink control information (UCI) on only one codeword of the more than one codeword.

18. A method of a user equipment (UE), comprising:

receiving, from a network, a configuration for a multiple layer physical uplink shared channel (PUSCH) transmission that uses more than one codeword;

receiving, from the network, an indication of a number of layers mapped to at least one codeword of the more than one codeword;

determining, based at least partly on the number of layers mapped to the at least one codeword of the more than one codeword, a number of layers of the multiple layer PUSCH transmission that is mapped to each codeword of the more than one codeword; and transmitting, in accordance with the configuration for the multiple layer PUSCH transmission that uses more than one codeword, the multiple layer PUSCH transmission, the multiple layer PUSCH transmission transmitted on at least a first layer of multiple layers using the first codeword of the more than one codeword, and on at least a second layer of the multiple layers using a second codeword of the more than one codeword.

19. The method of claim 18, wherein the multiple layer PUSCH transmission is a PUSCH transmission on more than four layers.

20. The method of claim 18, wherein:

the indication of the number of layers mapped to at least one codeword of the more than one codeword comprises an indication of a first number of layers mapped to the first codeword; and determining the number of layers of the multiple layer PUSCH transmission that is mapped to each codeword of the more than one codeword comprises determining, based at least partly on the first number of layers mapped to the first codeword, a second number of layers of the multiple layer PUSCH transmission that is mapped to the second codeword.

* * * * *